# United States Patent [19]

Stern

[11] 4,056,500
[45] Nov. 1, 1977

[54] AEROSOL-DISPENSED LATEX PAINT COMPOSITIONS

[75] Inventor: David Stern, Roslyn, N.Y.

[73] Assignee: Martin Paint and Chemical Corporation, Jamaica, N.Y.

[21] Appl. No.: 542,220

[22] Filed: Jan. 20, 1975

Related U.S. Application Data

[63] Continuation-in-part of Ser. No. 278,212, Aug. 7, 1972, abandoned, which is a continuation-in-part of Ser. No. 168,916, Aug. 4, 1971, abandoned.

[51] Int. Cl.$^2$ ............... C08L 33/08; C08L 31/04; B65D 35/38
[52] U.S. Cl. ................ 260/29.6 MN; 222/92
[58] Field of Search ............ 260/29.6 MN, 29.6 MM, 260/29.6 R

[56] References Cited

U.S. PATENT DOCUMENTS

| 2,953,284 | 9/1960 | Prussin et al. | 222/394 |
|---|---|---|---|
| 3,370,024 | 2/1968 | Grasko et al. | 260/3.5 |
| 3,488,308 | 1/1970 | Colbert et al. | 260/23 |

OTHER PUBLICATIONS

Paint Industry Processing & Materials Manual (1966), RCH Publications, New Kingston, Pa. p. 50.

*Primary Examiner*—Lucille M. Phynes
*Attorney, Agent, or Firm*—Ostrolenk, Faber, Gerb & Soffen

[57] ABSTRACT

A latex aerosol paint composition having a total solids content of less than 40%, a viscosity of from 10 to 60 seconds measured on the No. 4 Ford cup, a pigment content of from 2 to 15%, is dispensed from an aerosol container having a mechanical break-up valve utilizing nitrogen or air as the propellant. The ratio by volume of the compressed nitrogen or air at a pressure of 100 psi at 70° F to the volume of the paint composition is from 60:40 to 50:50. In the preferred embodiment, the volume ratio of the nitrogen to the paint formulation is 60:40. The solids content may be as low as 30%, and the viscosity of the paint formulation is from 15 to 30 seconds on the No. 4 Ford cup. It is preferred that the average particle size range of the pigment be from 0.2 to 0.3 microns.

9 Claims, 3 Drawing Figures

AEROSOL-DISPENSED LATEX PAINT COMPOSITIONS

The present application is a continuation-in-part of my now abandoned application Ser. No. 278,212, filed Aug. 7, 1972, which in turn is a continuation-in-part of my now abandoned application Ser. No. 168,916, filed Aug. 4, 1971.

BACKGROUND OF THE INVENTION

The present invention relates to an aerosol latex paint formulation dispensed in a finely atomized spray from a pressurized aerosol container utilizing nitrogen or air as a propellant. A smooth paint film is produced by the finely atomized spray which is substantially free of unwanted foam.

In the past, it has been very difficult to successfully dispense latex paints from aerosol containers due to foaming that occured on discharging of the formulation from the aerosol container. This resulted in a non-uniform film which dried to a rough uneven surface. The paint coatings thus obtained were not aesthetically acceptable and in many cases did not adhere properly to the surface that was coated. In addition, attempts to discharge commonly employed latex paint formulations from aerosol dispensers generally have been unsuccessful because, in addition to the foaming which was caused largely by the propellants employed, the relatively high viscosity of the latex paint formulations employed prohibited the proper atomization of the spray dispensed from the aerosol valve.

Among the many propellants which have been tried by me in past attempts to dispense latex paint formulations from aerosol containers are butane, propane, carbon dioxide, nitrous oxide, vinyl chloride, isobutane, and the usual halogenated fluorocarbons such as Freon-11, Freon-12, Freon-114, and Freon-115.

It is also believed that the use of cellulosic thickeners in conventional latex paint formulations may have contributed to the prevention of proper atomization as well as constituting a cause of foaming.

SUMMARY OF THE INVENTION

I have found that these difficulties in successfully dispensing a latex paint from an aerosol container can be overcome by the utilization of a latex paint formulation of relatively low viscosity and low solids content which is dispensed by means of nitrogen or air as the propellant. I have found that it is essential to use the combination of the special latex paint formulation described hereinbelow, together with the nitrogen or air as a propellant in order to successfully dispense the latex paint from an aerosol dispenser, that is, in order to obtain proper atomization and eliminate foaming. While a fair degree of success is obtained by using conventional aerosol discharge nozzles with this special latex paint formulation and nitrogen or air as the propellant, it is preferred, and actually essential to obtain optimum results, to also utilize a mechanical break-up device with the aerosol discharge nozzle.

According to the present invention, the nitrogen or air, which is 18% nitrogen, is employed in a volume ratio to the paint formulation when contained in a pressurized aerosol dispenser at a pressure of 100 psi at 70° F, of from 60:40 to 50:50.

The paint formulation utilized according to the present invention as indicated is one which has a relatively low solids content and low viscosity compared to previously employed latex paint compositions. Furthermore, it is preferred that any bodying agent employed be of a non-cellulosic nature. The latex paint composition according to the present invention is one in which the solids content is less than 40%, preferably ranging from 25 to 35% with 30% by weight being most preferred. The viscosity of the latex paint formulation-utilized in this invention should be from 10 to 60 seconds by No. 4 Ford cup (20 to about 209 cps.) with 15 to 30 seconds preferred and 20 to 25 seconds most preferred. The particle size of the pigments employed should be less than 0.5 microns with a size range of 0.2 to 0.3 preferred. The pigment preferably comprises from 20 to 15% by weight of the paint formulation.

As indicated above, while the combination of the low viscosity and low solids content latex paint formulation described together with nitrogen or air utilized as the propellant substantially eliminates the unwanted foaming and promotes proper atomization, it is essential for most effective results to employ a mechanical break-up device in conjunction with the discharge nozzle of the aerosol container. A number of suitable mechanical break-up devices utilized in aerosol discharge nozzles are known. One particularly preferred mechanical break-up device is disclosed in my co-pending application Ser. No. 168,916 referred to above.

BRIEF DESCRIPTION OF THE DRAWING

Referring to the accompanying drawing.

DESCRIPTION OF PREFERRED EMBODIMENTS

In the accompanying drawing, a conventional type of aerosol container, which is utilized for discharging the improved latex paint formulation by means of nitrogen or air as the propellant according to the present invention, is illustrated.

Figure 1:
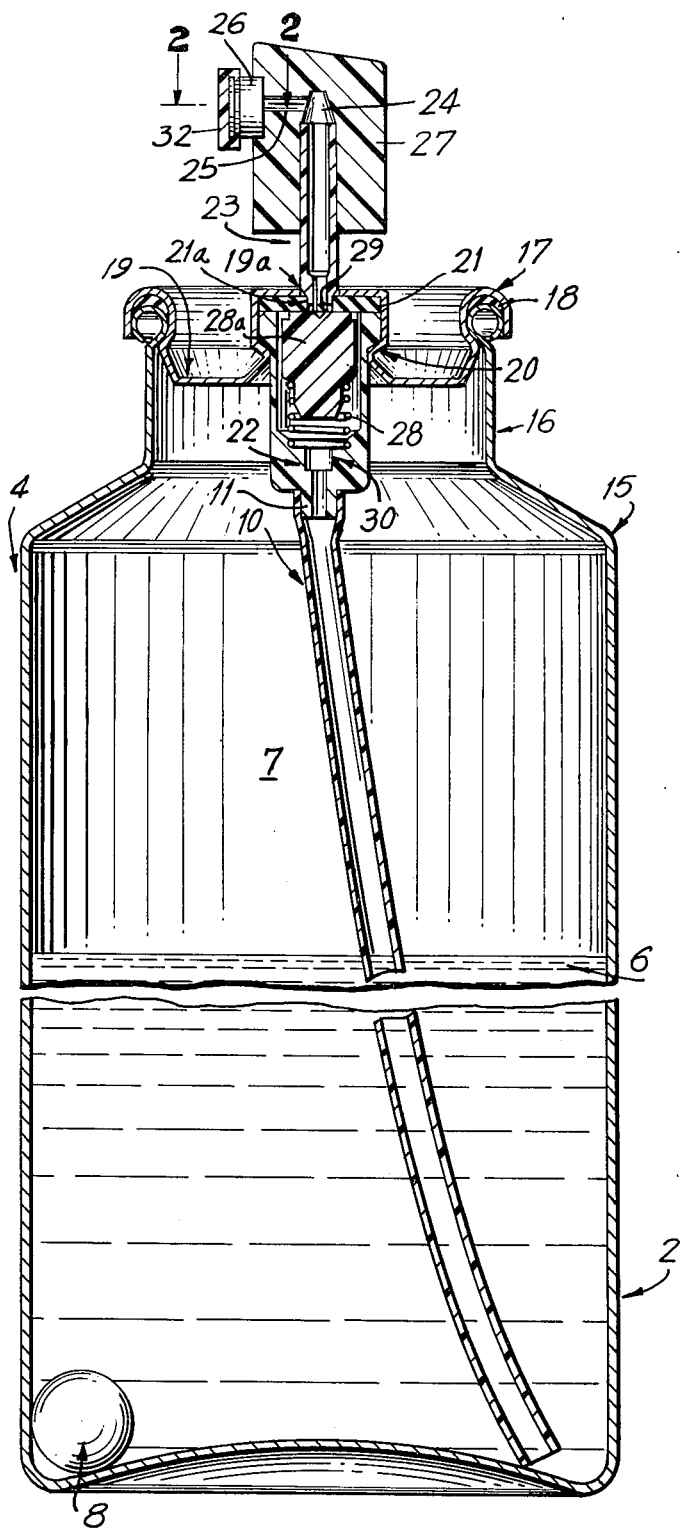
FIG. 1 is a central vertical sectional view of a typical aerosol dispenser utilized in storing and discharging the improved latex paint formulation according to the present invention.

Referring to FIG. 1 of the drawing, an aerosol dispenser comprising a conventional aerosol can is indicated generally at 2. The inner surfaces of the metal aerosol can 4 are preferably coated with a lacquer composition as an anti-corrosion film because of the high water content of the latex paint formulation. The latex paint formulation 6 is contained in the lower portion of the can below the compressed nitrogen or air indicated at 7. In order to help obtain the proper distribution of the pigment in the paint formulation, a sphere 8 of metal inert to the paint formulation is placed in the aerosol container to aid in agitating the paint formulation when the can is shaken prior to discharge of the latex paint formulation. During the discharge operation, the paint formulation in which, as discussed below, a portion of the nitrogen propellant is entrained, is discharged through the dip tube 10 which is force-fitted over the annular neck 11 leading into the valve structure of the aerosol container. In the aerosol container 2 shown in the drawing, the upper portion of the walls of the can 4 are inclined as indicated at 15 and then terminate in cylindrical portion 16 which is crimped at 17 to the top 19 of the aerosol container 2. Within the crimped section, there is provided a seal 18 between the surfaces of the side portion 16 and top 19. The top 19 of the container 2 is shaped so as to hold the valve body 22 by means of the crimping at 20 and is also shaped so as to retain the annular gasket at 21 as shown in a conventional manner. The upper portion of the annular hollow conduit extension 23 of the valve structure extends into the chamber 24 in the pushbutton actuator 27. The conduit 23 is forcefitted into a corresponding opening in the pushbutton actuator 27 in the usual manner. The lower portion of the conduit 23 is necked in as it passes through the central annular opening 19a in the top 19 of the aerosol container. The wall of the central opening 21a of the annular gasket 21 presses against the necked-in portion of the conduit 23 as shown when the valve is in the closed position. The lateral ports 29 in the necked-in portion of the conduit 23 are closed off by the central walls of the gasket 21 when the valve is in the closed position. When the pushbutton actuator 27 is depressed, this forces the central portion of the valve downward so that the ports 29 are moved away from the central walls of the gasket 21 and the composition to be discharged flows up the dip tube 10 to the bottom 30 of the valve body 22 through the central portion of the valve body 22 through the ports 29 up through the conduit 23. The valve is biased to the closed position by the upward push of the spring 28. As mentioned, the conduit 23 communicates with the chamber 24 in the central portion of the pushbutton actuator 27. The chamber 24 is connected by lateral duct 25 with the nozzle head 26 which is press-fitted into a counterbore 37 in the face of the pushbutton actuator 27 in a conventional manner. Prefereably the face on the nozzle head 26 is covered with a removable cap 32 to minimize the drying or hardening of any residual paint composition in the nozzle structure or the surrounding area.

Figure 2:
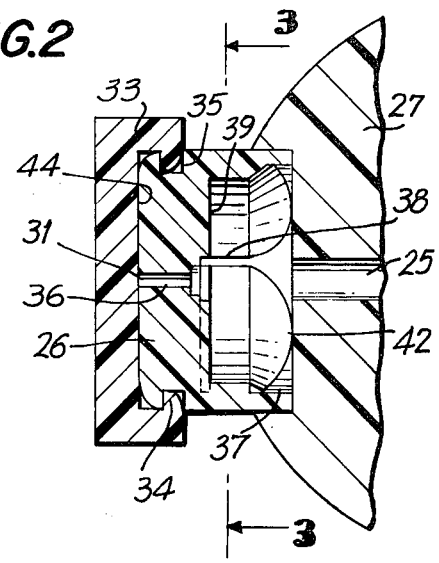
FIG. 2 is an enlarged section taken along lines 2—2 of FIG. 1 illustrating the discharge nozzle embodying a mechanical break-up device.
Figure 3:
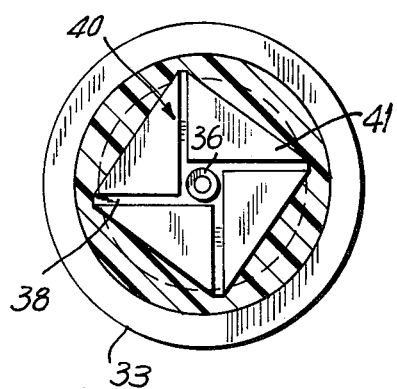
FIG. 3 is a vertical sectional view taken along lines 3—3 of FIG. 2 further illustrating the details of the mechanical break-up device of the discharge nozzle.

In FIGS. 2 and 3, the structure of the mechanical break-up device of the discharge nozzle 26 is shown in greater detail. Removably fitted to the front of the nozzle head 26 is the removable cap 32 which is preferably constructed of a resilient plastic material which is inert to the latex paint formulation. The cap is provided with an annular extension 33 which terminates in an inwardly extending flange which snaps into annular recess 35 in the nozzle head 26, which is formed of rigid plastic in a conventional manner. It is not necessary that the flange and recess be utilized, it being sufficient that the annular extension 33 is frictionally engaged with the sides of the nozzle body 26. The nozzle head 26 is provided with the discharge nozzle 36 centrally located in the nozzle body, having an orifice 31 from which the aerosol spray may exit when the cap 32 is removed. When the pushbutton actuator 27 is depressed, the propellant and latex paint composition mixture flows through the valve body up through the conduit 23 to the chamber 24 and thence into and through the lateral passage 25 and into the space formed by the counterbore 37 of the nozzle body 26 and the cutout in the pushbutton actuator 27. From this space, the propellant-paint mixture is distributed into a plurality of narrow, generally radial, grooves 38 which serve to break-up the stream and promote proper atomization of the spray discharged from the container 2. The flow of the propellant-paint mixture passes from the grooves 38 into the narrow passageway 36 and then exits the nozzle at the orifice 31. The mechanical break-up device is formed in the front wall 39 of the nozzle head 26 and in the embodiment illustrated is in the form of a square body 40 which may be formed integrally with the nozzle body 26 or secured to the front wall of the nozzle body 26, or secured to the front wall of the nozzle body 26. In the embodiment shown, the body 40 is traversed by the four grooves 38 which communicate with the passage 36 and divide the body into four generally triangular sections 41 from whose edges adjancent to the outer wall of the nozzle head 26 rise flat walls which are connected by arcuate portions 42 with the wall of the counterbore 37. These grooves 38 aid in effecting both the thorough mixing of the mixture of paint and propellant and greatly contribute to the break-up of the mixture into an atomized spray as it reaches the nozzle passageway 36. The lateral passage 25 is of a larger diameter than the nozzle passageway 36. There is an abrupt reduction in the diameter of the paint stream from duct 25 to passageway 36 through the grooves 38.

The nozzle body 26 is force-fitted into the bore in the pushbutton actuator 27 in a manner that the counterbore 37 is bounded at one end by the four approximately triangular portions 41 of the part 40 and open at its opposite end for communication with lateral passage 25.

As indicated, the latex paint formulation which I utilize in combination with the nitrogen or air propellant can be discharged from a conventional aerosol container without the formation of unwanted foams but with the proper atomization of the discharge spray. It is essential for best results, however, that a mechanical break-up device be utilized to promote the optimum atomization of the discharged paint spray.

Using the mechanical break-up device illustrated in the drawings I found that a nozzle orifice of approximately 0.016 inch to about 0.020 inch in diameter is suitable for many applications. As known in the art, the dimensions of the orifice may be varied depending upon the actual viscosity and pigment content of the paint formulation that is employed for optimum results.

Utilizing the combination of nitrogen or air propellant and the latex formulations dispensed from aerosol containers according to this invention, a coating of flat, semi-gloss, or high-gloss surfaces, or clear finishes can be obtained. It is known that the degree of gloss will vary according to the amount of pigment included in the formulation — the lower the pigment content, the higher the gloss.

It is particularly surprising that a relatively insoluble gas such as nitrogen, or air, blends and mixes with the aerosol paint formulation to a sufficient degree to greatly enhance the atomization of the paint composition as the propellant and paint mixture is discharged through the nozzle. There is no noticeable foaming and uniform films are readily deposited from a conventional aerosol container. To assure proper mixing of propellant and paint and to assure that most or almost all the paint is discharged, the volume ration of propellant to paint under 100 psi at 70° F should be from 60:40 to 50:50, preferably 60:40.

The container should be shaken before use in order for the propellant to become entrained in the paint formulation and to assure thorough mixing of the paint components. The protective cap on the nozzle body is then removed and the pushbutton actuator depressed, opening the valve and thus permitting the mixture of propellant and paint composition to discharge from the container. As indicated, the mechanical break-up device in the nozzle structure additionally helps in producing the fine atomized spray of the paint which results in the application of a uniform film.

I have also found that it is very desirable that the latex paint formulation not contain any cellulosic bodying agents but that the bodying agents be comprised entirely of non-cellulosic bodying agents such as Attapulgus clay.

By way of example, a latex paint formulation suitable for utilization in my invention had the following composition:

LATEX AEROSOL REDWOOD SPRAY

This aqueous spray is comprised of the following substances in approximately the proportions indicated:

| Pigment | | | 6.18% |
|---|---|---|---|
| | Composed of | % | |
| | 1. Synthetic Iron Oxide | 72.72 | |
| | 2. Attapulgus Clay | 27.28 | |
| Vehicle | | | 93.82% |
| | 3. Water | 62.90 | |
| | 4. Surfactant | 1.02 | |
| | 5. Antifoam Agent | 0.22 | |
| | 6. Ester Alcohol | 0.95 | |
| | 7. Preservative | 0.11 | |
| | 8. Resin | 34.80 | |

Examples of the substances listed above and their properties are as follows:

PIGMENT

1. Synthetic Iron Oxide: Jet milled synthetic red iron oxide
   Code No. J.3110
   Specific gravity 5.5
   Oil absorption 20
   Hegman dispersion index 6½
   Density (lb/sol.gal.) 42.90
   Permanence index Min. 9.9
2. Attapulgus clay, sold by Minerals and Chemical Division of Engelhard
   Available as "Attagel" 40 or 50 Fine
   Average particle size in microns 0.14
   Free moisture as produced (wt.% at 220° F.) 12.0
   Lb. per gal. 19.70
   Color Light Cream

VEHICLE

3. Water: Tap water is satisfactory
4. Surfactant: Igepal CTA 639 (General Aniline); polyoxethylated p-nonylphenol
   Aromatic, colorless liquid
   Density at 25° C 1.06
   Flash point 535° – 555° F
   Cloud point 126° – 133° F
5. Antifoam Agent: Colloid 677
   (Colloids Inc., Newark, N.J. 07114)
   pH 5.8
   Wt./gal. at 70° F 7.35 lbs.
   Physical state: Pale yellow liquid
6. Ester Alcohol (coalescing agent): "Texanol" (a water immiscible 12-carbon ester-alcohol)
   (Eastman Chemical Products, Inc.)
   Specific gravity, 20°/20° C 0.945 – 0.955
   Carbonyl, as CO, wt.% 0.4% max.
7. Preservative: "Dowicil 100" (Dow Chemical Co.)
   Non-phenolic antimicrobial agent (1-(3-chlorallyl) -3,5,7-triaza-1-azomaadamantane chloride).
   ("Dowicil 100" preservative has been registered with the United States Department of Agriculture in conformance with the Federal Insecticide and Fungicide Atc #464–327.)
8. Resin: AC 490 (Rohm & Haas (100% acrylic emulsion (46% solid acrylic resin); or
   Celanese CL 222, 100% vinyl-acrylic emulsion (55% solids).
   AC 490 (or Rhoplex AC-490) is an aqueous acrylic emulsion containing lower alkyl esters of acrylic acid and methacrylic acid wherein the lower alkyl group has up to four carbon atoms, a small amount of unsaturated carboxylic acid, and a minor amount of another ethylenically unsaturated compound.
   Celanese CL-22, more specifically, is a stabilized nonionic, high molecular weight, fine particle size polyvinylacetate-lower alkyl (preferably methyl or ethyl) acrylate copolymer emulsion.

As mentioned, the viscosity range of the paint formulations used in this invention is 15 sec. to 60 sec. (measured by the No. 4 Ford cup).

For redwood finishes, I prefer to employ as the surfactant, as above indicated, polyoxethylated p-nonylphenol. For other latex aerosol paints, the surfactant or wetting agent can be any known and suitable substance, depending upon the desired color of the paint. The wetting agent acts to reduce the surface tension of the paint. Suitable other surfactants or wetting agents are "Tamol 731" (sodium salt of polycarboxylated condensed naphthalene), and "Tamol 850" (Rohm & Haas) and "Igepol CO 630" (General Aniline)(a nonylphenoxypoly [ethyleneoxy] ethanol having a hydrophylic number of 63 and a concentration of 99 plus %). For redwood finishes, General Aniline's "CTA 639" yields exceptionally good results.

It is also possible to utilize metallic paint when the pigment consists entirely or predominantly of aluminum, gold, copper, bronze or other metallic powder particles within the size ranges defined above.

In general, I prefer to employ an aqueous vinyl-acrylic vehicle whose total solids content is about 30% by weight and whose viscosity is 20 to 25 seconds on the No. 4 Ford cup. Vinyl-acrylic vehicles are preferred; however, any of the vehicles ordinarily employed in latex paints are suitable, such as styrene-butadiene copolymers, polyvinyl acetate, and the like.

An essential requirement is that the overall paint formulation have less than 35% solids content and a viscosity of less than 60 seconds on the No. 4 Ford cup. The average particle sizes of the pigment should be under 0.5 microns.

It is within the skill of those in the art to adjust the diameter of the nozzle orifice to provide a steady uniform flow of atomized paint formulation, depending upon the particular viscosity and solids content of the particular formulation employed within the parameters set forth above. The pigment content should be kept at a relatively low content of 2 to 15% by weight based on the total weight of the paint formulation.

While the invention has been explained by a detailed description of certain specific embodiments, it is understood that various modifications and substitutions can be made in any of them within the scope of the appended claims which are intended also to include equivalents of such embodiments.

I claim:

1. In a pressurized dispenser having a spray discharge nozzle controlled by a discharge valve and connected to a dip tube, the combination of an aqueous vinyl acetate-lower alkyl acrylate copolymer emulsion paint composition free of cellulosic bodying agents and having a pigment suspended therein, the composition having a viscosity of between 10 and 60 seconds measured on the No. 4 Ford cup (20 to 209 cps) at room temperature, and a solids content of 25 to 40% by weight, said dispenser having a relatively waterinsoluble propellant therein occupying the space above the paint composition and characterized by the capacity for discharging such composition in a spray without being materially dissolved in the composition whereby the discharged spray is substantially devoid of foaming, said propellant comprised predominantly of gaseous nitrogen under pressure.

2. A pressurized dispenser according to claim 1, wherein the ratio of the propellant to the paint composition by volume when measured at a pressure of 100 pounds per square inch at 70° F. ranges from about 60:40 to about 50:50, the ratio of vinyl acetate to acrylate monomer being 80:20.

3. A pressurized dispenser according to claim 1, wherein the pigment comprises from 2 to 15% by weight, and the vehicle from 85% to 98% by weight of the paint composition, the ratio of vinyl acetate to the acrylate monomer being 80:20.

4. The combination according to claim 3, wherein the average particle size of the pigment in the paint composition is between 0.2 and 0.3 micron in diameter.

5. The combination according to claim 3, wherein said propellant is nitrogen.

6. The combination according to claim 3, wherein said propellant is air.

7. The combination according to claim 3, wherein the average particle size of said pigment is less than 0.5 micron in diameter.

8. The combination according to claim 7, wherein the pigment comprises from 5 to 10% by weight of the paint formulation.

9. The combination according to claim 1, wherein said aerosol dispenser is provided with a discharge nozzle having a mechanical break-up device to promote atomization upon discharge of the paint composition.

* * * * *